United States Patent
Takeda et al.

(10) Patent No.: US 11,886,003 B2
(45) Date of Patent: Jan. 30, 2024

(54) OPTICAL WAVEGUIDE

(71) Applicant: Nippon Telegraph and Telephone Corporation, Tokyo (JP)

(72) Inventors: Koji Takeda, Tokyo (JP); Shinji Matsuo, Tokyo (JP); Hidetaka Nishi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 79 days.

(21) Appl. No.: 17/432,317

(22) PCT Filed: Apr. 2, 2020

(86) PCT No.: PCT/JP2020/015160
§ 371 (c)(1),
(2) Date: Aug. 19, 2021

(87) PCT Pub. No.: WO2020/213412
PCT Pub. Date: Oct. 22, 2020

(65) Prior Publication Data
US 2022/0171129 A1    Jun. 2, 2022

(30) Foreign Application Priority Data
Apr. 16, 2019   (JP) ................. 2019-077604

(51) Int. Cl.
G02B 6/12       (2006.01)
G02B 6/036      (2006.01)

(52) U.S. Cl.
CPC ......... *G02B 6/12009* (2013.01); *G02B 6/036* (2013.01); *G02B 2006/12061* (2013.01)

(58) Field of Classification Search
CPC .......... G02B 2006/12061; G02B 2006/12078; G02B 2006/121
See application file for complete search history.

(56) References Cited

U.S. PATENT DOCUMENTS 4,456,998 A * 6/1984 Tanaka ................. H01S 5/2231
                                                  372/45.01
5,703,989 A    12/1997 Khan et al.
(Continued)

FOREIGN PATENT DOCUMENTS

CN      1274857 A  * 11/2000
CN    102684069 A  *  9/2012
(Continued)

OTHER PUBLICATIONS

CN-102684069-A English translation (Year: 2012).*
(Continued)

*Primary Examiner* — Charlie Y Peng
(74) *Attorney, Agent, or Firm* — Slater Matsil, LLP

(57) ABSTRACT

A core and a slab layer that are formed on a lower clad layer are provided. The lower clad layer is formed on a substrate. The core is comprised of a semiconductor and has a rectangular shape in a cross-sectional view. The slab layer is comprised of a semiconductor. The core and the slab layer have a thickness that allows only up to a secondary mode of light to be present. Further, the core and the slab layer are laminated on the lower clad layer. Further, the core and the slab layer are disposed to be optically coupled to each other.

6 Claims, 5 Drawing Sheets

(56) References Cited

U.S. PATENT DOCUMENTS

| | | | |
|---|---|---|---|
| 7,082,235 B2* | 7/2006 | Gunn, III | B82Y 20/00 |
| | | | 385/28 |
| 8,451,874 B2* | 5/2013 | Huang | H01S 5/2231 |
| | | | 372/50.1 |
| 8,891,913 B1* | 11/2014 | Roth | G02B 6/132 |
| | | | 385/27 |
| 2003/0059190 A1 | 3/2003 | Gunn, III et al. | |
| 2008/0037607 A1* | 2/2008 | Hashimoto | H01S 5/2231 |
| | | | 372/45.01 |
| 2008/0198888 A1* | 8/2008 | Arimoto | H01S 5/0424 |
| | | | 359/344 |
| 2009/0116523 A1 | 5/2009 | Leem et al. | |
| 2017/0031094 A1* | 2/2017 | Nakashiba | G02F 1/025 |
| 2018/0088290 A1* | 3/2018 | Fish | G02B 6/4203 |

FOREIGN PATENT DOCUMENTS

| | | | |
|---|---|---|---|
| CN | 104092096 A | * | 10/2014 |
| JP | 2018151538 A | | 9/2018 |

OTHER PUBLICATIONS

CN-104092096-A English translation (Year: 2014).*
CN-1274857-A English translation (Year: 2000).*
Bogaerts et al. Silicon-on-Insulator Spectral Filters Fabricated With CMOS Technology, IEEE Journal of Selected Topics in Quantum Electronics, vol. 16, No. 1, Jan./Feb. 2010, pp. 33-44.
Okayama et al., "Si Wire Array Waveguide Grating with Reduced Phase Error: Effect of advanced lithography process," 18th OptoElectronics and Communications Conference held jointly with 2013 International Conference on Photonics in Switching (OECC/PS), Jun. 30, 2013, 2 pages.

* cited by examiner

OPTICAL WAVEGUIDE

CROSS-REFERENCE TO RELATED APPLICATIONS

This application is a national phase entry of PCT Application No. PCT/JP2020/015160, filed on Apr. 2, 2020, which claims priority to Japanese Application No. 2019-077604, filed on Apr. 16, 2019, which applications are hereby incorporated herein by reference.

TECHNICAL FIELD

The present disclosure relates to an optical waveguide having a core comprised of a semiconductor.

BACKGROUND

With the recent progress of silicon photonics technology, many optical devices using an optical waveguide having a core obtained by processing a surface Si layer of a silicon on insulator (SOI) substrate have been studied. In order to increase the communication capacity of optical devices in silicon photonics, incorporating of technologies such as digital coherent technology and wavelength division multiplexing (WDM) has been actively examined. In order to construct the WDM, it is necessary to bundle a large number of light beams having different wavelengths by using an arrayed waveguide grating (AWG) or the like. In order to manufacture the AWG, it is necessary to arrange a large number of optical waveguides while slightly changing the length of optical path of each optical waveguide and to strictly control the equivalent refractive index and length of the optical waveguides (see Non Patent Literatures 1 and 2).

CITATION LIST

Non Patent Literature

Non Patent Literature 1—W. Bogaerts et al., "Silicon-on-Insulator Spectral Filters Fabricated With CMOS Technology", IEEE Journal of Selected Topics in Quantum Electronics, vol. 16, no. 1, pp. 33-44, 2010.

Non Patent Literature 2 H. Okayama et al., "Si Wire Array Waveguide Grating with Reduced Phase Error: Effect of Advanced Lithography Process", 18th Opto Electronics and Communications Conference held jointly with 2013 International Conference on Photonics in Switching, WM2-1, 2013.

SUMMARY

Technical Problem

In Si photonics, a core serving as an optical waveguide can be easily formed by etching the surface Si layer of an SOI wafer entirely or halfway in the depth direction. However, in order to actually manufacture a core and the like, lithography and etching are required. In the process of processing the surface Si layer using these techniques, the equivalent refractive index of the optical waveguide fluctuates sensitively with respect to the creation error such as the core width and the core height (etching depth). Therefore, in order to apply the above-described techniques to an optical waveguide device using optical interference, there is a problem that an additional optical phase adjustment function is required. Further, a Mach-Zehnder interferometer can be operated as an interferometer by providing a phase adjustment function, but when it is necessary to make a large number of optical waveguides while changing their optical path lengths as in the AWG, there is a problem that the phase adjustment operation is difficult.

The present disclosure has been made to solve the above-described problems and an object thereof is to provide an optical waveguide in which an equivalent refractive index does not easily change with respect to a processing error during manufacturing.

Means for Solving the Problem

An optical waveguide according to the present disclosure includes a core that is formed on a clad layer, is comprised of a semiconductor, and has a rectangular shape in a cross-sectional view, and a slab layer that is laminated on the clad layer with the core to be optically coupled to the core and is comprised of a semiconductor.

One configuration example of the optical waveguide further includes a spacer layer that is formed between the core and the slab layer and is comprised of an insulator.

In one configuration example of the optical waveguide, the core and the slab layer are in contact with each other in a laminating direction.

In one configuration example of the optical waveguide, the core and the slab layer have a thickness that allows only up to a second mode of light to be present.

In one configuration example of the optical waveguide, one of the core and the slab layer is comprised of Si and another one of the core and the slab layer is comprised of a compound semiconductor.

One configuration example of the optical waveguide further includes another slab layer that is laminated on the clad layer with the slab layer on the surface where the core is not formed.

Effects of Embodiments of the Invention

As described above, according to the present disclosure, because the core that is comprised of a semiconductor and has a rectangular shape in a cross-sectional view and the slab layer that is comprised of a semiconductor are laminated to be able to be optically coupled to each other, it is possible to provide the optical waveguide in which an equivalent refractive index does not easily change with respect to a processing error during manufacturing.

DETAILED DESCRIPTION OF ILLUSTRATIVE EMBODIMENTS

Hereinafter, an optical waveguide according to embodiments of the present disclosure will be described.

First Embodiment

Figure 1:
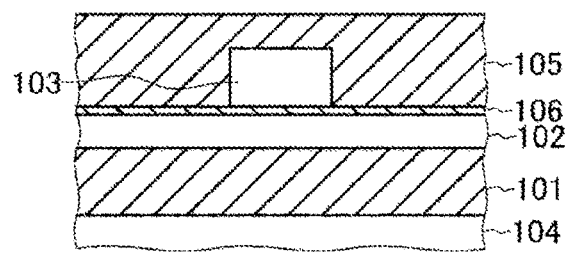
FIG. 1 is a cross-sectional view illustrating a configuration of an optical waveguide according to a first embodiment of the present disclosure.

First, an optical waveguide according to a first embodiment of the present disclosure will be described with reference to FIG. 1. This optical waveguide includes a core 103 and a slab layer 102 both formed on a lower clad layer 101. The lower clad layer 101 is formed on a substrate 104. The core 103 is comprised of a semiconductor and has a rectangular shape in a cross-sectional view. The slab layer 102 is comprised of a semiconductor. The core 103 and the slab layer 102 have a thickness that allows only up to a second mode of light to be present.

Further, the core 103 and the slab layer 102 are laminated on the lower clad layer 101. Further, the core 103 and the slab layer 102 are disposed to be optically coupled to each other. Additionally, in the first embodiment, the core 103 is disposed on the slab layer 102 when viewed from the lower clad layer 101.

Further, in the first embodiment, a spacer layer 106 that is comprised of an insulator and is formed between the core 103 and the slab layer 102 is provided. Further, an upper clad layer 105 is formed on the spacer layer 106 (on the slab layer 102). The core 103 is embedded in the upper clad layer 105.

The substrate 104, the lower clad layer 101, and the slab layer 102 are, for example, a substrate portion, an embedded insulating layer, and a surface Si layer, respectively, of a well-known silicon on insulator (SOI) substrate. In this case, the slab layer 102 is comprised of Si. Further, the core 103 can be comprised of, for example, a compound semiconductor such as InP.

Hereinafter, a method of manufacturing the optical waveguide according to the first embodiment of the present disclosure will be described with reference to FIGS. 2A to 2C.

Figure 2A:
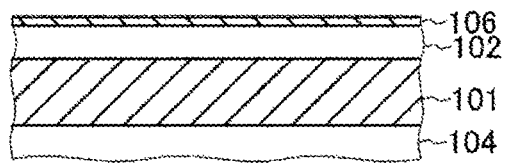
FIG. 2A is a cross-sectional view illustrating a configuration of the optical waveguide in an intermediate step for describing a method of manufacturing the optical waveguide according to the first embodiment of the present disclosure.

First, an SOI substrate is prepared and, as illustrated in FIG. 2A, the lower clad layer 101 that is an embedded insulating layer of the SOI substrate and the slab layer 102 that is a surface silicon layer of the SOI substrate are formed on the substrate 104 that is a substrate portion of the SOI substrate. Next, the spacer layer 106 having a predetermined thickness is formed on the slab layer 102 by depositing silicon oxide ($SiO_2$) by a well-known chemical vapor deposition (CVD) method.

Figure 2B:
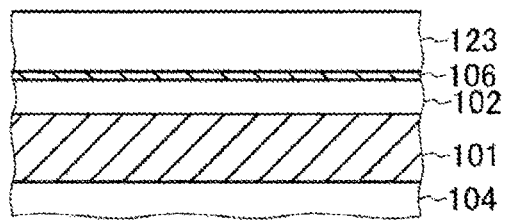
FIG. 2B is a cross-sectional view illustrating a configuration of the optical waveguide in an intermediate step for describing a method of manufacturing the optical waveguide according to the first embodiment of the present disclosure.

Next, an InP substrate is stuck to the surface of the spacer layer 106 by a well-known direct bonding method, the stuck InP substrate is thinned, and as illustrated in FIG. 2B, an InP layer 123 is formed on the spacer layer 106. The InP substrate can be thinned by etching.

Further, an etching stop layer is formed on the InP substrate by InGaAs or the like and an InP layer is formed on the etching stop layer. Next, the InP substrate is stuck by bonding the InP layer to the spacer layer 106. Next, the InP substrate is thinned by grinding and polishing and then is removed by wet etching. In this wet etching, the InP substrate can be selectively removed without controlling an etching time by using the etching stop layer. Then, the InP layer 123 can be formed on the spacer layer 106 by removing the etching stop layer by selective etching.

Further, the InP substrate can be separated from the stuck InP layer by using the etching stop layer as a sacrificial layer and removing only the etching stop layer (sacrificial layer) by etching processing in which InP is not etched and InGaAs is etched.

Further, hydrogen atoms are introduced at a high concentration by an ion implantation method at a depth of several μm from the surface of the InP substrate. Next, the surface of the InP substrate is bonded to the spacer layer 106. Then, of the InP substrate. Next, the bonded InP substrate is subjected to heat treatment at 400 to 600° C. By these treatments, the bond between the crystals is broken and the InP substrate can be easily separated in a region of several μm from the substrate surface into which hydrogen ions are implanted. When the InP substrate is separated at the layer in which the crystal bonds are broken, the InP layer can be formed on the spacer layer 106 [Smart Cut (trade name) method].

Figure 2C:
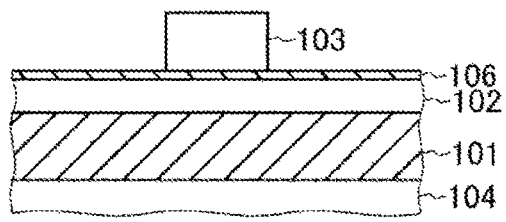
FIG. 2C is a cross-sectional view illustrating a configuration of the optical waveguide in an intermediate step for describing a method of manufacturing the optical waveguide according to the first embodiment of the present disclosure.

After the InP layer 123 is formed on the spacer layer 106 as described above, the core 103 is formed on the spacer layer 106 as illustrated in FIG. 2C by patterning the InP layer 123 by known lithography technique and etching technique. Then, the upper clad layer 105 is formed as illustrated in FIG. 1 by depositing SiO$_2$ by a CVD method.

Figure 3:
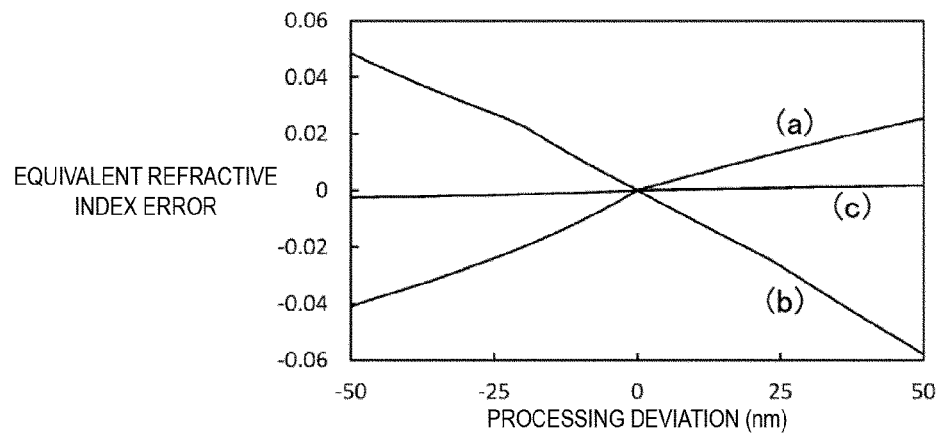
FIG. 3 is a characteristic diagram showing a result of calculating an equivalent refractive index of an optical waveguide using a finite difference method.

Next, a result of calculating an equivalent refractive index of the optical waveguide using a finite difference method is shown in FIG. 3. FIG. 3(*a*) is a result of calculating an optical waveguide (a channel type optical waveguide) with a Si core having a rectangular shape in a cross-sectional view. The width of the silicon core was 500 nm. FIG. 3(*b*) is a calculation result of a Si rib type optical waveguide. The width of the rib was 500 nm and the height of the rib was 70 nm.

FIG. 3(*c*) is a calculation result of the optical waveguide according to the first embodiment. The slab layer 102 comprised of Si had a thickness of 220 nm. The core 103 comprised of InP had a width of 500 nm and a height of 250 nm. Further, the spacer layer 106 comprised of SiO$_2$ had a layer thickness of 50 nm.

FIG. 3 shows that a processing deviation from a design is plotted in a horizontal axis and an error of an equivalent refractive index of the optical waveguide from a design (here, a value ΔN/N obtained by dividing a difference ΔN between a refractive index, when a processing deviation occurs, and a design value by a refractive index N is defined as an error) is plotted in a vertical axis in the above-described conditions. In FIGS. 3(*a*) and 3(*c*), the processing deviation is based on how much the core width direction of the optical waveguide deviates from 500 nm. Further, in FIG. 3(*b*), the processing deviation is based on how much the height of the rib deviates from 70 nm. As obvious from FIG. 3, it can be seen that the equivalent refractive index in the optical waveguide (c) of the first embodiment is less likely to deviate from the design even when the processing of the optical waveguide deviates from the design as compared with the conventional structures (a) and (b).

When the inclination ΔN/ΔX was calculated in three types of structures on the assumption of the processing deviation of the optical waveguide as ΔX and the deviation of the refractive index from the design value as ΔN, (a) $2.1 \times 10^{-3}$, (b) $-2.8 \times 10^{-3}$, and (c) $1.7 \times 10^{-4}$ were obtained. According to the first embodiment, it can be seen that there is an effect of suppressing an equivalent refractive index error of one digit or more as compared with the conventional structure.

Figure 4:
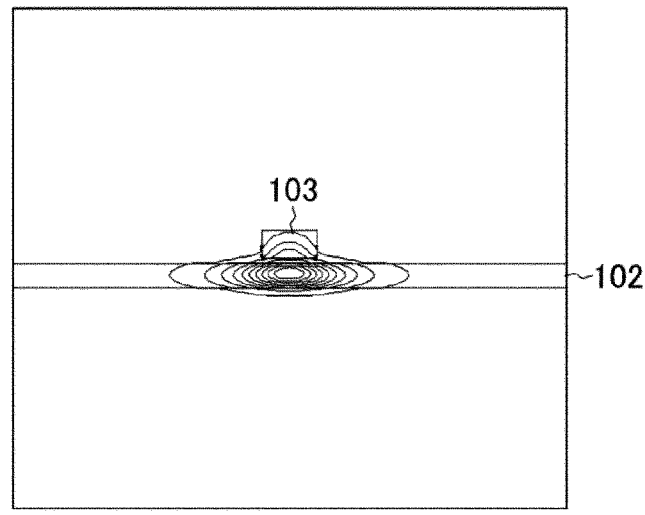
FIG. 4 is a distribution diagram illustrating a mode distribution of the optical waveguide according to the first embodiment calculated by a finite difference method.

Next, a mode distribution (intensity) of the optical waveguide of the first embodiment calculated by the finite difference method is illustrated in FIG. 4. It can be seen that much of the energy in the waveguide mode is confined in the slab layer 102 and the horizontal distribution is defined by the core 103.

Second Embodiment

Next, an optical waveguide according to a second embodiment of the present disclosure will be described. First, a manufacturing method will be described with reference to FIGS. 5A to 5D.

Figure 5A:
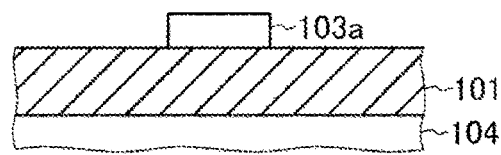
FIG. 5A is a cross-sectional view illustrating a configuration of an optical waveguide in an intermediate step for describing a method of manufacturing an optical waveguide according to a second embodiment of the present disclosure.

First, an SOI substrate is prepared and the lower clad layer 101 that is an embedded insulating layer of the SOI substrate and a surface silicon layer of the SOI substrate are formed on the substrate 104 that is a substrate portion of the SOI substrate. Next, a core 103*a* comprised of Si is formed on the lower clad layer 101 as illustrated in FIG. 5A by patterning the surface silicon layer with known lithography and etching techniques. The core 103*a* is formed in a rectangular shape in a cross-sectional view.

Figure 5B:
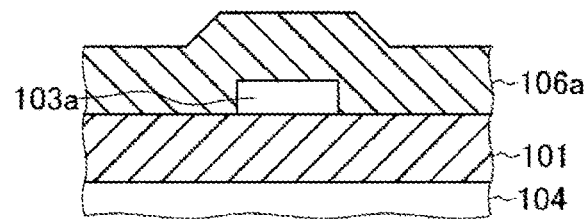
FIG. 5B is a cross-sectional view illustrating a configuration of the optical waveguide in an intermediate step for describing a method of manufacturing the optical waveguide according to the second embodiment of the present disclosure.
Figure 5C:
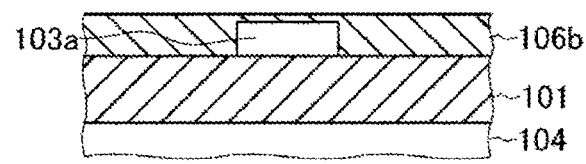
FIG. 5C is a cross-sectional view illustrating a configuration of the optical waveguide in an intermediate step for describing a method of manufacturing the optical waveguide according to the second embodiment of the present disclosure.

Next, a SiO$_2$ layer 106*a* is formed on the lower clad layer 101 with embedding the core 103*a* as illustrated in FIG. 5B by depositing SiO$_2$ by a well-known CVD method. Next, a spacer layer 106*b* is formed as illustrated in FIG. 5C by flatting the surface of the SiO$_2$ layer 106*a* by a known grinding and polishing method such as chemical mechanical polishing (CMP). The spacer layer 106*b* is formed on the lower clad layer 101 with embedding the core 103*a* and the surface of the spacer layer 106*b* is flattened.

Figure 5D:
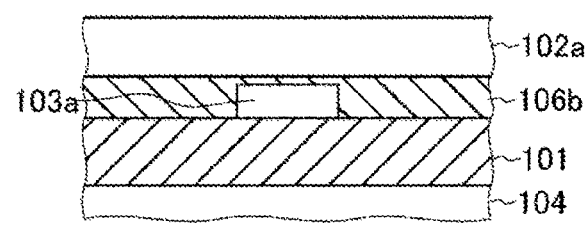
FIG. 5D is a cross-sectional view illustrating a configuration of the optical waveguide in an intermediate step for describing a method of manufacturing the optical waveguide according to the second embodiment of the present disclosure.

Next, an InP substrate is stuck to the surface of the spacer layer 106*b* by a well-known direct bonding method, the suck InP substrate is thinned, and as illustrated in FIG. 5D, a slab layer 102*a* comprised of InP is formed on the spacer layer 106*b*. In the optical waveguide according to the second embodiment, the slab layer 102*a* comprised of InP (compound semiconductor) is disposed on the core 103*a* comprised of Si when viewed from the lower clad layer 101. Additionally, the core 103*a* and the slab layer 102*a* have a thickness that allows only up to a second mode of light to be present.

According to the second embodiment, for example, when an n-type region and a p-type region are formed on the slab layer 102*a* in the plane direction of the lower clad layer 101 in a cross-sectional view by sandwiching the i-type region above the core 103*a*, optical functional elements such as light emitting diodes, semiconductor lasers, optical amplifiers, light modulators, and light receivers can be formed.

Third Embodiment

Next, an optical waveguide according to a third embodiment of the present disclosure will be described. First, a manufacturing method will be described with reference to FIGS. 6A to 6D.

Figure 6A:
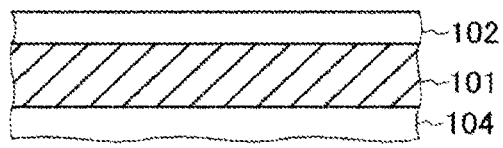
FIG. 6A is a cross-sectional view illustrating a configuration of an optical waveguide in an intermediate step for describing a method of manufacturing an optical waveguide according to a third embodiment of the present disclosure.

First, an SOI substrate is prepared and, as illustrated in FIG. 6A, the lower clad layer 101 that is an embedded insulating layer of the SOI substrate and the slab layer 102 that is a surface silicon layer of the SOI substrate are formed on the substrate 104 that is a substrate portion of the SOI substrate.

Figure 6B:
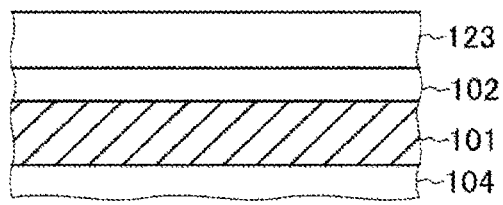
FIG. 6B is a cross-sectional view illustrating a configuration of the optical waveguide in an intermediate step for describing a method of manufacturing the optical waveguide according to the third embodiment of the present disclosure.

Next, an InP substrate is stuck to the surface of the slab layer 102 by a well-known direct bonding method, the stuck InP substrate is thinned, and, as illustrated in FIG. 6B, the InP layer 123 is formed on the spacer layer 106.

Figure 6C:
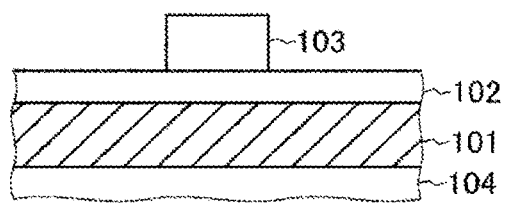
FIG. 6C is a cross-sectional view illustrating a configuration of the optical waveguide in an intermediate step for describing a method of manufacturing the optical waveguide according to the third embodiment of the present disclosure.
Figure 6D:
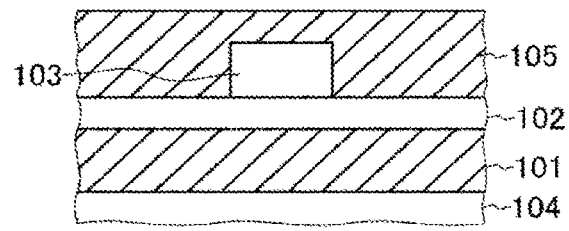
FIG. 6D is a cross-sectional view illustrating a configuration of the optical waveguide in an intermediate step for describing a method of manufacturing the optical waveguide according to the third embodiment of the present disclosure.

After the InP layer 123 is formed on the slab layer 102 as described above, the core 103 is formed on the slab layer 102 as illustrated in FIG. 6C by patterning the InP layer 123 with known lithography and etching techniques. In the etching for forming the core 103, the slab layer 102 comprised of Si can also be used as the etching stop layer. Then, the upper clad layer 105 covering the core 103 is formed on the slab layer 102 as illustrated in FIG. 6D by depositing SiO$_2$ by a CVD method.

In the optical waveguide according to the third embodiment, the core 103 and the slab layer 102 are in contact with each other in a laminating direction. Additionally, the core 103 and the slab layer 102 have a thickness that allows only up to a second mode of light to be present. According to the third embodiment, there is an advantage that an element that establishes electrical conduction between the slab layer 102 comprised of Si and the core 103 comprised of InP (compound semiconductor) can be manufactured.

Next, the thickness of the core and the slab layer of the optical waveguide according to the present disclosure will be described. In the core and the slab layer, the optical waveguide is operated in multiple modes when there are a plurality of modes in the thickness direction. The second mode (first odd mode) has no strength at the core center of the optical waveguide, but the third mode (second even mode) has strength at the core center of the optical waveguide. Accordingly, it is preferable to use the optical waveguide in a range without the third mode. In other words, it is preferable that the core and the slab layer have a thickness that allows only up to a secondary mode of light to be present.

Figure 7:
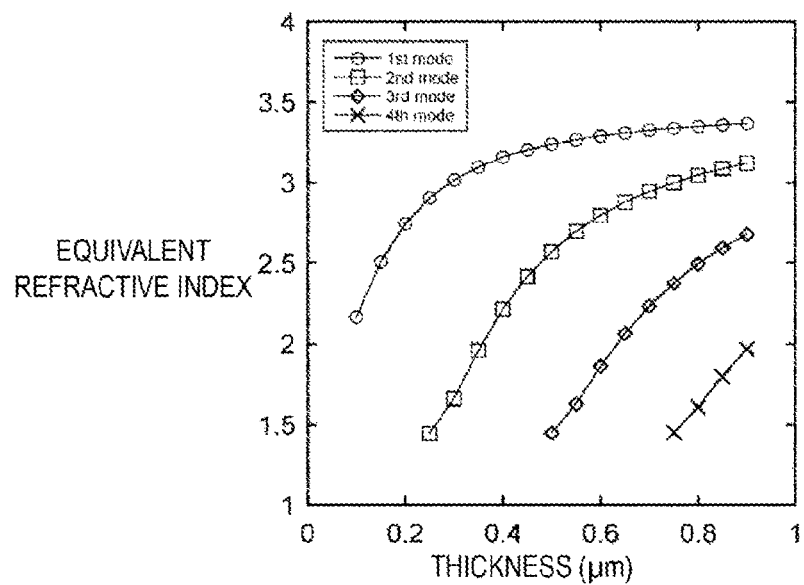
FIG. 7 is a characteristic diagram showing a result of calculating a mode of a slab optical waveguide with a Si core and plotting an equivalent refractive index as a function of a film thickness.

FIG. 7 shows a result of calculating the mode of the slab optical waveguide with an Si core and plotting the equivalent refractive index as a function of the film thickness. It can be seen that the third mode does not exist when the thickness of the Si core is 0.5 µm or less, but the third mode exists when the thickness of the silicon core becomes thicker than 0.5 µm. For this reason, when the core or slab layer is comprised of Si, it is preferable that the thickness be 0.5 µm or less.

Fourth Embodiment

Figure 8:
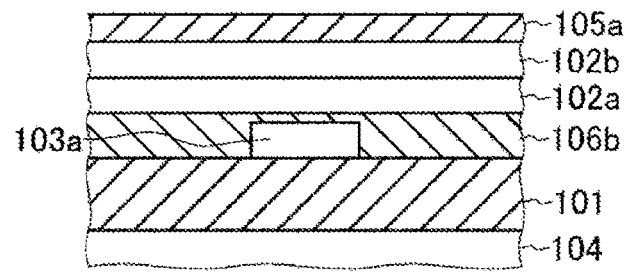
FIG. 8 is a cross-sectional view showing a configuration of an optical waveguide according to a fourth embodiment of the present disclosure.

Next, an optical waveguide according to a fourth embodiment of the present disclosure will be described with reference to FIG. 8. The optical waveguide includes the core 103a and the slab layer 102a formed on the lower clad layer 101. The lower clad layer 101 is formed on a substrate 104. Further, the optical waveguide includes the spacer layer 106b that is formed on the lower clad layer 101 with embedding the core 103a and the surface of which is flattened. The slab layer 102a is formed on the spacer layer 106b. These configurations are the same as those in the second embodiment.

In addition to the above-described configuration, in the fourth embodiment, another slab layer 102b that is laminated with the slab layer 102a is provided. Further, an upper clad layer 105a is formed on another slab layer 102b. The slab layer 102a and another slab layer 102b can be comprised of InGaAsP. According to the fourth embodiment, the slab layer 102a can function as a phase modulation unit and another slab layer 102b can function as an optical amplification unit. With this configuration, it is possible to implement an optical modulator without light loss (or capable of performing optical amplification) when the refractive index of the slab layer 102a is modulated from the outside while the light loss due to the scattering of light guided through the optical waveguide is compensated for by another slab layer 102b.

Additionally, in the description above, a case in which two slab layers are provided has been exemplified, but the present disclosure is not limited thereto. For example, three or more slab layers can be provided.

As described above, according to the present disclosure, because the core comprised of a semiconductor and having a rectangular shape in a cross-sectional view and the slab layer comprised of a semiconductor are laminated to be optically coupled to each other, it is possible to provide the optical waveguide in which an equivalent refractive index does not easily change with respect to a processing error during manufacturing.

The present disclosure is not limited to the embodiments described above, and it is obvious that many modifications and combinations can be implemented by a person having ordinary knowledge in the field within the technical spirit of the present disclosure.

REFERENCE SIGNS LIST

101 Lower clad layer
102 Slab layer
103 Core
104 Substrate
105 Upper clad layer
106 Spacer layer.

The invention claimed is:

1. An optical waveguide comprising:
a core disposed over a clad layer, wherein the clad layer is disposed over a semiconductor substrate, wherein the core is made of a first semiconductor material, and wherein the core has a rectangular shape in a cross-sectional view;
a spacer layer over the core, wherein the spacer layer comprises an insulator material and directly contacts a top surface of the core, sidewalls of the core, and a top surface of the clad layer; and
a slab layer disposed over and directly contacting the spacer layer, wherein the slab layer is configured to be optically coupled to the core, wherein the slab layer is made of a second semiconductor material, and wherein the first semiconductor material is a compound semiconductor material, and wherein the second semiconductor material is silicon.

2. The optical waveguide according to claim 1, wherein the core and the slab layer have a thickness that allows only up to a second mode of light to be present.

3. The optical waveguide according to claim 1, further comprising:
a second slab layer disposed over the slab layer.

4. An optical waveguide comprising:
a substrate;
a lower clad layer over the substrate;
a core over the lower clad layer;
a spacer layer over the core, wherein the spacer layer comprises an insulator material and directly contacts a top surface of the core, sidewalls of the core, and a top surface of the lower clad layer; and
a slab layer over and directly contacting the spacer layer, wherein the slab layer is made of a first semiconductor material, wherein the core is made of a second semiconductor material, wherein the core has a rectangular shape that is narrower than the lower clad layer and the slab layer in a cross-sectional view, wherein the slab layer is configured to be optically coupled to the core, and wherein the first semiconductor material is a compound semiconductor material, and wherein the second semiconductor material is silicon.

5. The optical waveguide according to claim 4, wherein the core and the slab layer have a thickness that allows only up to a second mode of light to be present.

6. The optical waveguide according to claim 4, further comprising:
an upper slab layer over the slab layer, wherein the upper slab layer comprises a semiconductor material.

* * * * *